Figure 1:
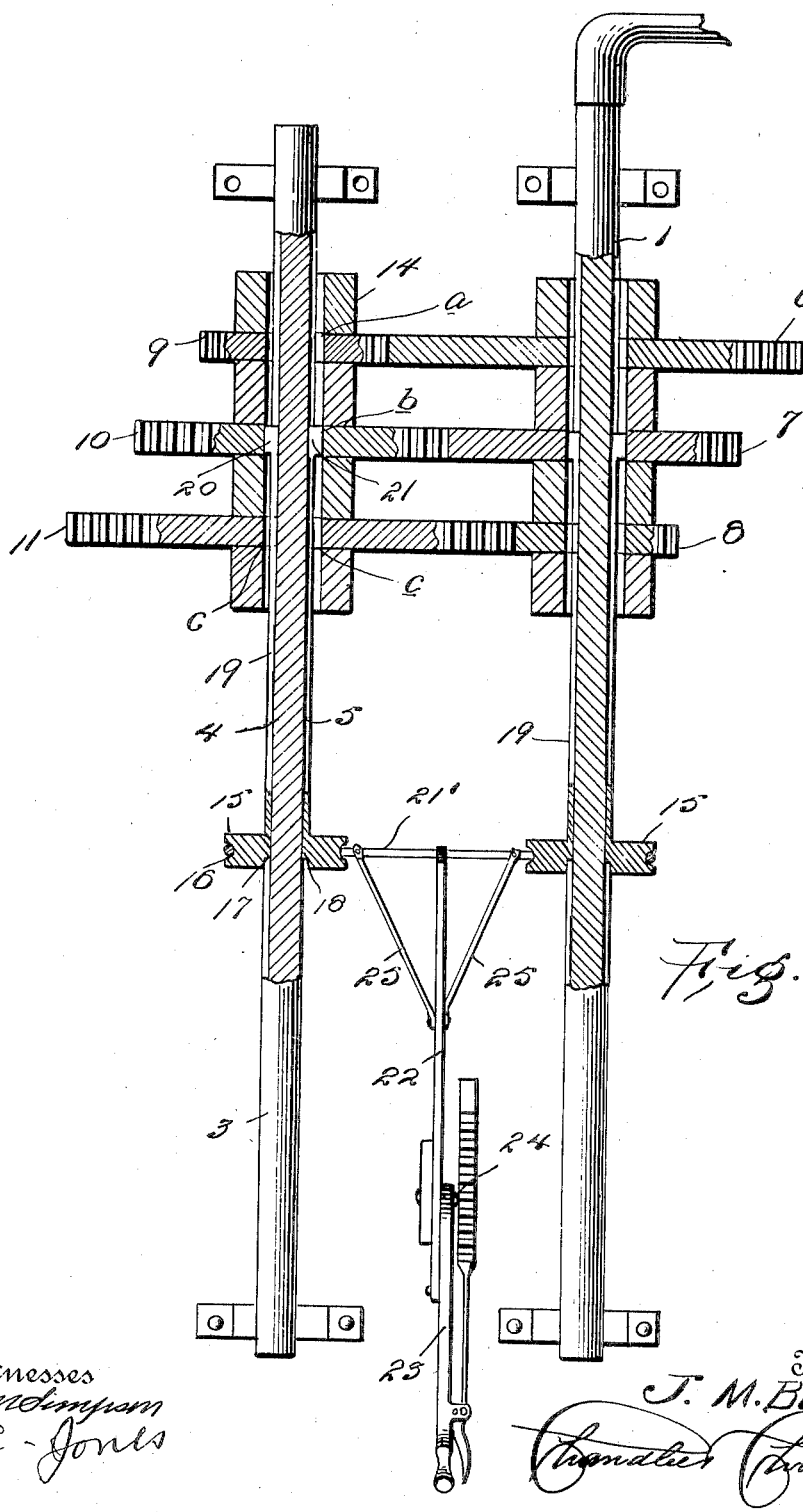

No. 802,259. PATENTED OCT. 17, 1905.
J. M. BILLINGSLEY.
CHANGEABLE GEARING.
APPLICATION FILED DEC. 18, 1903.

2 SHEETS—SHEET 2.

Witnesses
O. M. Simpson
F. C. Jones

Inventor
J. M. Billingsley
By Chandler & Chandler
Attorneys

UNITED STATES PATENT OFFICE.

JOHN MARSHAL BILLINGSLEY, OF BILLINGSLY, TENNESSEE.

CHANGEABLE GEARING.

No. 802,259.      Specification of Letters Patent.      Patented Oct. 17, 1905.

Application filed December 18, 1903. Serial No. 185,653.

*To all whom it may concern:*

Be it known that I, JOHN MARSHAL BILLINGSLEY, a citizen of the United States, residing at Billingsly, in the county of Bledsoe, State of Tennessee, have invented certain new and useful Improvements in Changeable Gearing; and I do hereby declare the following to be a full, clear, and exact description of the invention, such as will enable others skilled in the art to which it appertains to make and use the same.

This invention relates to changeable gearing, and has particular reference to mechanism for varying the speed of the driven shaft without varying the speed of the driving-shaft, one object of the invention being to attain this result by providing both driving and driven shafts with a series of wheels loosely mounted thereupon with means for keying any one of corresponding sets of wheels at the will of the operator.

Another object of the invention resides in the provision of a simple, efficient, and easily-operated two-change or more speed-gear designed for heavy or light transmission.

With these and other objects in view the present invention consists in the combination and arrangement of parts hereinafter more fully described, illustrated in the drawings, and pointed out in the appended claims.

Figure 2:
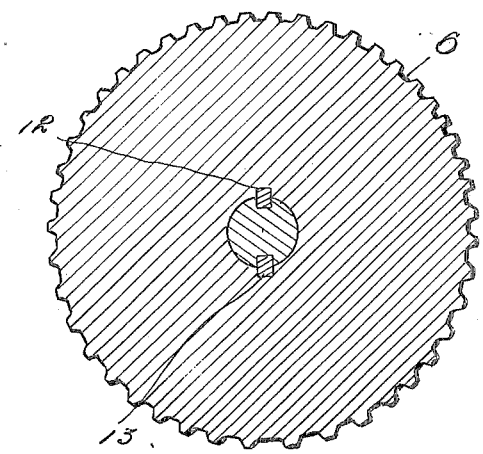
Figure 3:
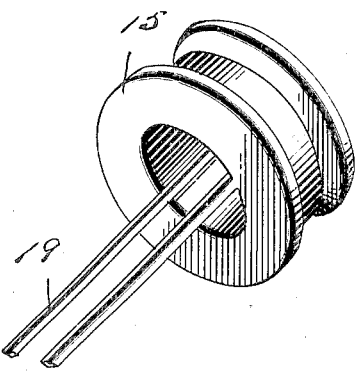
Figure 4:
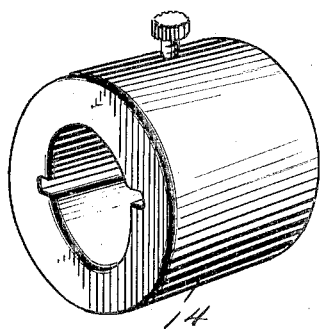

In the drawings, Figure 1 is a view, partially in section and partially in elevation, showing an embodiment of the invention. Fig. 2 is a section through one of the gear-wheels and the shaft on which it is mounted and showing the adjustable splines engaged therewith. Fig. 3 is a perspective view showing one of the spacing-collars. Fig. 4 is a perspective view showing one of the collars with the splines carried thereby.

Referring to the drawings, the numeral 1 designates the driving-shaft having any suitable means for connection with an engine or other power, the reference character 3 indicating the driven shaft, from which power is transmitted in the usual manner. Each of these shafts is provided with a pair of oppositely-disposed longitudinal grooves 4 and 5 throughout a portion of its length, as shown.

Loosely mounted upon the driving-shaft 1 is a series of gear-wheels 6, 7, and 8, decreasing in size in the order indicated, and a companion series of gear-wheels 9, 10, and 11 are arranged on the driven shaft and which increase in size in the order indicated. By reference to Fig. 4 of the drawings it will be seen that the bore of each of the gear-wheels is provided with oppositely-disposed recesses or notches 12 and 13, adapted to correspond and aline with the longitudinal grooves in the shafts 1 and 3. Each corresponding set of gear-wheels is held apart by means of the spacing-collars or other elements 14, all of which are fixedly secured to both shafts and have their bores provided with oppositely-disposed notches corresponding and alining with the longitudinal grooves in the shafts.

In order to fasten the companion or adjacent gear-wheels to their respective shafts, there is a key mounted on each shaft comprising a collar 15, having a peripheral groove 16 and a bore provided with inwardly-directed oppositely-disposed lugs 17 and 18, adapted to have a working fit in the corresponding longitudinal grooves of the said shafts. Elongated arms or spline portions 19 lead from the collar 15 of each key, terminating in the oppositely disposed and directed heads 20 and 21, and are adapted for sliding movement in the oppositely-arranged grooves of the said shafts, the said heads of the keys, while of greater breadth than the body portion thereof, passing through the complete slots formed by the grooves in the shaft and the corresponding notches in the gear-wheels and spacing-collars until the operator desires to shift the keys, as will be explained.

Extending horizontally across the shafts intermediate their length and secured to the grooved peripheries of the collar 15 in any suitable manner is a strap or other connection 21', pivoted intermediate the length of which and extending downwardly therefrom is a link connection 22, secured to the lower end of which is a lever 23, pivoted at 24 to the floor or any other part of the framework (not shown) of the machine or place in which the apparatus may be installed, as well understood. The strap and link connections just alluded to are preferably braced by means of the rods or other form of brace 25.

With the heads 20 and 21 in the positions shown in Fig. 1 of the drawings it will be seen that the gear-wheels 7 and 10 are secured to their respective shafts so that one shaft will be rotated from the other at the same speed, these two gear-wheels being of equal diameters. By operation of the lever 23 the heads of the keys or splines may be shifted to engage in the wheels 9 and 6 or in the wheels 11 and 8. When engaged in the wheels 9 and 6, the shaft 3, which is the driven shaft, will be rotated at a higher speed than the shaft 1, owing to the wheel 6 being of greater diameter than the wheel 9. If the heads 20 and 21 be shifted to engage the wheels 11 and 8, then the shaft 3 will be rotated from the shaft 1 at a reduced speed by reason of the fact that the wheel 8 is of lesser diameter than the wheel 11.

It is to be understood that I do not limit myself to the number of shafts or gear-wheels employed and that changes may be made in proportion, size, material, and minor details without departing from the spirit of my invention.

What is claimed is—

1. A variable-speed mechanism, comprising a driving-shaft having oppositely-disposed grooves arranged therein throughout a portion of its length, a driven shaft having grooves arranged therein throughout a portion of its length, gear-wheels loosely mounted upon each shaft, and means operating simultaneously within said grooves for interchangeably keying oppositely-disposed wheels to their respective shafts.

2. A variable-speed mechanism, comprising a driving-shaft having oppositely-disposed grooves arranged therein throughout a portion of its length, a driven shaft having oppositely-disposed grooves arranged therein throughout a portion of its length, gear-wheels loosely mounted upon each shaft, independent spacing-collars fixedly mounted upon each shaft between each wheel mounted thereon, and means operating simultaneously within said grooves for interchangeably keying oppositely-disposed wheels to their respective shafts.

3. A variable-speed mechanism, comprising a driving-shaft having longitudinal grooves therein, a driven shaft having longitudinal grooves therein, gear-wheels mounted upon each shaft, spacing means between each wheel, a collar having projecting members slidably mounted in the grooves of said shafts, a connection between the collars, and means for interchangeably keying the projecting portions of the collars with oppositely-disposed wheels and their respective shafts.

4. A speed-changing mechanism, comprising two shafts, separate gears of different size revolubly supported on each shaft, the gears on one shaft meshing with those on the other shaft in reverse order, means for locking each shaft to any one gear thereon, and interconnected means for unlocking the shafts from one pair of meshing gears and locking them to another pair of meshing gears, as set forth.

In testimony whereof I affix my signature in presence of two witnesses.

JOHN MARSHAL BILLINGSLEY.

Witnesses:
    E. E. HENRY,
    R. R. RIGSLY.